United States Patent [19]
Dieckroeger et al.

[11] Patent Number: 6,167,168
[45] Date of Patent: Dec. 26, 2000

[54] ARRANGEMENT OF OPTICAL WAVEGUIDES

[75] Inventors: Jens Dieckroeger; Reinhard Maerz, both of Munich, Germany

[73] Assignee: Siemens Aktiengesellschaft, Munich, Germany

[21] Appl. No.: 09/184,552

[22] Filed: Nov. 2, 1998

[30] Foreign Application Priority Data

Oct. 31, 1997 [DE] Germany .......................... 197 48 300

[51] Int. Cl.⁷ .................................................. G02F 1/035
[52] U.S. Cl. .................................... 385/3; 385/1; 385/40
[58] Field of Search ............................... 385/1–4, 8–10, 385/5, 37, 124, 40

[56] References Cited

U.S. PATENT DOCUMENTS

| | | | |
|---|---|---|---|
| 4,685,766 | 8/1987 | Nishimura et al. | 385/125 |
| 5,195,163 | 3/1993 | Burns et al. | 385/132 |
| 5,515,460 | 5/1996 | Stone | 385/24 |
| 5,559,906 | 9/1996 | Maerz | 385/3 |
| 5,805,751 | 8/1998 | Kewitsch et al. | 385/43 |

FOREIGN PATENT DOCUMENTS

| | | |
|---|---|---|
| 0 662 621 | 3/1995 | European Pat. Off. . |
| 0 756 184 | 1/1997 | European Pat. Off. . |
| 0 756 184 A2 | 1/1997 | European Pat. Off. . |
| 24 42 652 | 3/1976 | Germany . |

OTHER PUBLICATIONS

Bissessur et al., "Tunable phased–array wavelength demultiplexer on InP", Electronics Letters, Jan. 5, 1995, vol. 31, No. 1, pp. 32–33.

Bissessur et al, "Tunable phased–array wavelength demultiplexer on InP", *Electronics Letters*, Jan. 5, 1995, vol. 31, No. 1, pp. 32–33.

Joyner et al, "Optical NxN demultiplexer with continuous wavelength tuning by thin film heater", *Electronics Letters*, May 22, 1997, vol. 33, No. 11, pp. 933–934.

Møller et al, "Silica–Waveguide Thermooptic Phase Shifter with Low Power Consumption and Low Lateral Heat Diffusion", *IEEE Photonics Technology Letters*, vol. 5, No. 12, Dec. 1993, New York, U.S., pp. 1415–1418.

*Primary Examiner*—John D. Lee
*Assistant Examiner*—Michelle R. Connelly-Cushwa
*Attorney, Agent, or Firm*—Schiff Hardin & Waite

[57] ABSTRACT

A phased array with several optical waveguides with optical lengths that increase from waveguide to waveguide has a first arrangement for modifying the optical length of waveguides with the modification increasing from waveguide to waveguide in one direction and a second arrangement for producing a modification of the optical length with the modification decreasing from waveguide to waveguide in the one direction.

9 Claims, 6 Drawing Sheets

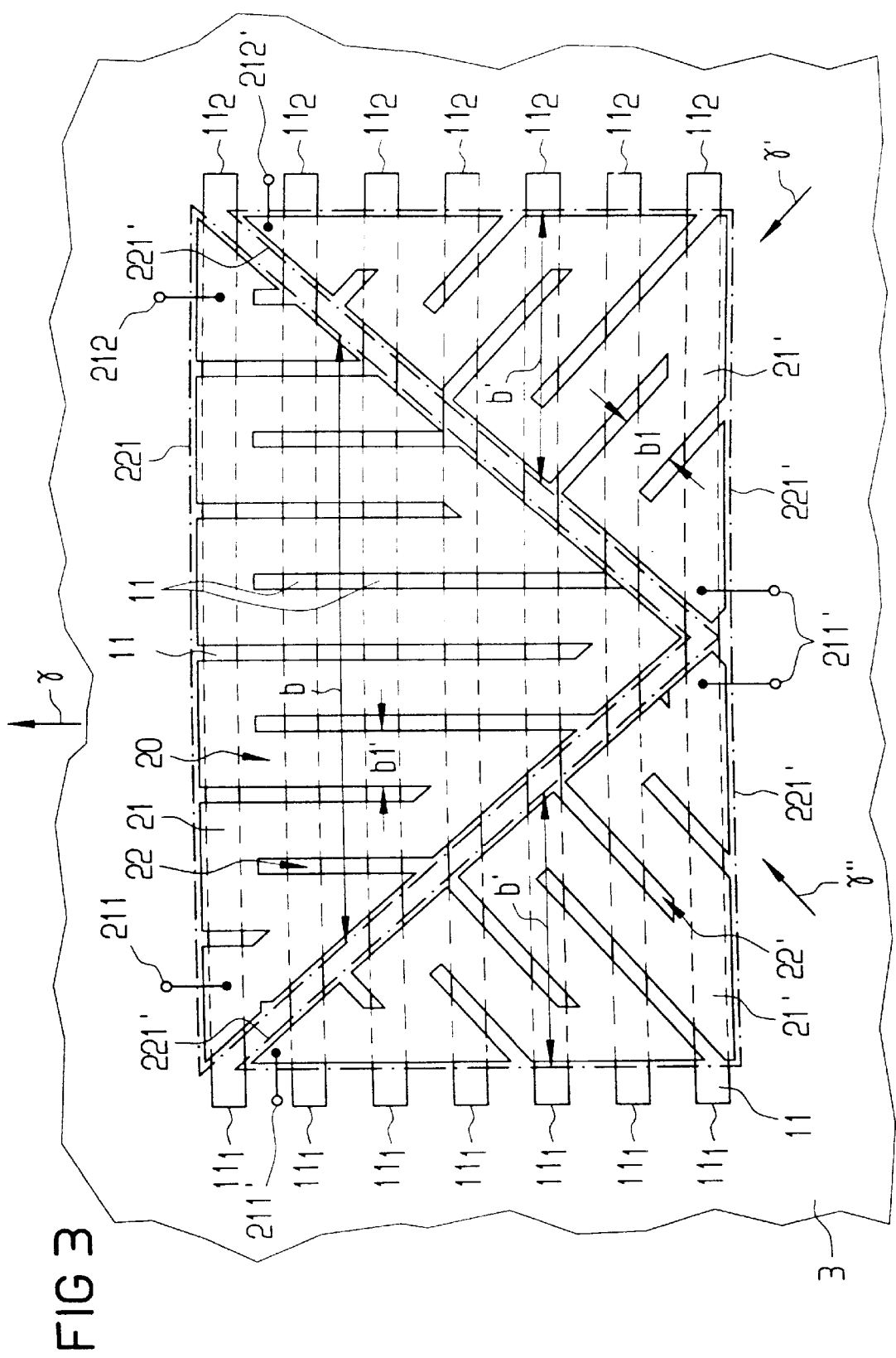

ARRANGEMENT OF OPTICAL WAVEGUIDES

BACKGROUND OF THE INVENTION

The present invention is directed to an arrangement of optical waveguides, which arrangement has at least two optical waveguides with each having an input side for coupling an optical wave into the waveguide and an output side for coupling out an optical wave conducted in the waveguides and each waveguide having a predetermined length between the two ends, and means for producing a modification of the optical length of the waveguide so that one waveguide can have a smaller optical length than the other waveguide.

U.S. Pat. No. 5,559,906, whose disclosure is incorporated herein by reference thereto and which claims priority from the same German Application as European Patent Document 0 662 621, discloses an optical arrangement which has at least two optical waveguides, each having an input-side end and an output-side end and each waveguide having a determined optical length between the two ends and means for producing a modification of the optical length of the waveguides so that the means produces an optical length in at least one of the waveguides smaller than the other waveguide.

The decisive optical length of a waveguide in such an arrangement is given by the product nL of an index of refraction n and a geometric length L of the waveguide. The geometric length L of the waveguide is the length of an optical axis extending between the coupling-in end and the coupling-out end of the waveguide, along which the optical wave is propagated in the waveguide. The index of refraction n of the waveguide is given as its effective index of refraction by $2\pi \cdot \beta \cdot \lambda$, wherein $\beta$ is the propagation constant of the optical wave conducted in this waveguide along the optical axis and $\lambda$ is its wavelength. Once the index of refraction n and the geometric length L of each waveguide of the arrangement is defined, the optical length nL for the waveguide is also defined.

The known arrangements comprise a means with which a modification $\Delta(nL)$ of the optical length nL of the waveguides is enabled, despite the defined optical length nL of each waveguide. Such means for the production of the modification $\Delta(nL)$ of the optical length nL of the waveguides can be fashioned in such a way that it modifies the index of refraction n of the waveguide and/or its geometrical length L.

For example, a waveguide can comprise a material with an index of refraction that can be modified by a certain physical quantity. The modification $\Delta(nL)$ of the optical length nL of this waveguide is, as a rule, greater the larger the absolute value of the physical quantity that modifies the index of refraction and/or the larger the part of the optical length nL of the waveguide is on which this quantity acts, and vice versa.

In U.S. Pat. No. 5,559,906, examples of the electro-optical effect, in which the waveguide comprises an electro-optical material whose index of refraction can be modified by allowing an electrical field to act on the material, were disclosed. The following are cited: charge carrier injection, in which the waveguide comprises semiconductor material whose index of refraction can be modified by an electrical injection of charge carriers into the material, and/or the thermo-optical effect, in which the waveguide comprises a thermo-optical material whose index of refraction can be modified by modification of the temperature.

In these cases, the means for producing a modification $\Delta(nL)$ of the optical length nL of the waveguide comprises means for the optical production of an electrical field, charge carriers and/or a temperature modification. A temperature modification can also produce a modification of the geometric length L of the waveguide.

Specifically, all waveguides in the known arrangement comprise an optical length nL different from one another so that this length nL, based on the waveguide of the shortest optical length, increases from waveguide to waveguide in the direction toward a waveguide of the greatest optical length. The different optical lengths nL of the different waveguides can be obtained by means of an index of refraction n differing from one another and/or geometrical length L of the waveguides differing from one another.

If, for example, the different waveguides have the same index of refraction n among themselves, the different optical lengths nL of the different waveguides can be obtained only by a different geometrical length L of these waveguides.

Moreover, the known arrangement is specifically set up so that the output-side ends of the waveguides are arranged with a small spatial distance from one another, so that the optical waves coupled out from these ends are superposed coherently on one another.

Given simultaneous coupling of an optical wave that contains one or more wavelengths differing from one another into all waveguides of this arrangement through the input-side end of these waveguides, each of these waveguides has an optical power portion containing all of these wavelengths of this wave is respectively conducted to the output-side of this waveguide and is coupled out at this end. The power portions coupled out from all output-side ends are coherently superposed on one another.

The mutually differing optical lengths nL of the waveguides and the coherent superposition of the coupled-out power portions provide that the coupled-out optical power portions falling at a single wavelength are concentrated in a spatial point allocated individually to this wavelength, and that the coupled-out optical power portions falling at wavelengths differing from one another are concentrated in spatial points that are spatially at a distance from one another.

In this way, given the use of a large number of optical waveguides, the known arrangement enables a large number of wavelengths differing from one another to be separated from one another, and each of these wavelengths can be a central wavelength of a respective optical wavelength channel.

Using the means for producing a modification of the optical length nL of the waveguides, in the known arrangement, it is possible to spatially displace the spatial point allocated individually to an individual wavelength, in which point the coupled-out optical power portions falling at this wavelength are concentrated. The spatial point can be displaced to such an extent that after this displacement, the spatial point assumes the position of a different spatial point at which, before the displacement, the coupled-out optical power portions of a different wavelength are concentrated, so that after the displacement, the coupled-out optical power portions falling of one wavelength are now concentrated at the location of the other spatial point.

The means for producing the modification $\Delta(nL)$ of the optical length of the waveguide is usefully fashioned in such a way that the produced modification $\Delta(nL)$ of the optical length nL, beginning with the waveguide with the shortest optical length, increases from waveguide to waveguide in the direction toward the waveguide with the greatest optical length.

For example, in the known arrangement, each waveguide comprises thermo-optical material that can be heated by means of a heating electrode. Above each waveguide, at least one respective heating electrode is present for heating the thermo-optical material, which electrode heats a part of the optical length nL of this waveguide that increases in the one direction from waveguide to waveguide. In this specific embodiment, the known arrangement can be used as a tunable optical grid or filter that enables separation of a large number of wavelength channels from one another, and, given a fixed wavelength, can be used as a 1×N switch, and can be used for a wave division multiplex (WDM) transmission, wavelength switching and/or wavelength conversion.

In the known means for producing a modification Δ(nL) of the defined optical length nL of the waveguides, the use of heating electrodes with the exploitation of the thermo-optical effect has the effect that this length nL can only be increased in each waveguide, and thereby the spatial displacement of the spatial point individually allocated to an individual wavelength, in which point the coupled-out optical power portions falling in this wavelength are concentrated, is possible only in one direction.

SUMMARY OF THE INVENTION

The underlying object of the present invention is to provide an arrangement of the type named above in which the optical power portions coupled out from the output-side ends of the waveguides can be modified with respect to their phase in a mutually opposed manner in relation to the phase state of these power portions given by the defined optical length of the waveguides.

This object is achieved by means of an improvement in an optical arrangement consisting of at least two optical waveguides of which each comprises an input-side end for coupling an optical waveguide into the waveguides and a respective output-side end for coupling out the optical waveguides conducted in the waveguide and a determined optical length between the two ends, and first means for producing a modification of the optical length of the waveguide so that in a waveguide, the produced modification of the optical length is smaller than in another waveguide. The improvement is that the present invention has second means for producing a modification of the optical length of the waveguides which produces a smaller modification in the other waveguide than in the one waveguide.

In the inventive arrangement, it is possible, independent of the exploited effect, which may be either an exploitation of the thermo-optical effect or the charge carrier injection, to optionally carry out a modification of the given phase state in one direction and, independent of this, a modification of the given phase state in a second direction opposite to the one direction, in particular simultaneously or in chronological succession. In particular, it is possible to cause a modification of the given phase state in mutually opposed directions by modifying the index of refraction of a photosensitive material which forms the waveguides.

A particularly advantageous construction of the arrangement is an arrangement wherein the waveguides are arranged next to one another at a spatial distance small enough that the optical waves coupled out from these ends are superposed coherently on one another and that at least two of the waveguides are dimensioned so that their optical length is different from one another and that the optical length is modified to increase from wavelength to wavelength in a direction γ. Preferably, two means are provided, with the first means causing different amounts of increase in one direction γ, while the second means causes decreasing amounts of change in the one direction γ.

This arrangement corresponds to the specific embodiment of the known arrangement that can be used as a tunable optical grid or filter, and, given a fixed wavelength, as a 1×N switch, but, however, has the specific advantage that even with the use of heating electrodes to exploit the thermo-optical effect or an effect that acts equivalently, such as a charge carrier injection, a modification Δ(nL) of the defined optical length nL of the waveguides can be carried out in such a way that the spatial displacement of the spatial points allocated individually to an individual wavelength, in which spatial points the optical power portions falling at this wavelength and coupled out from the output-side ends of the waveguides are concentrated, is possible in relation to the defined optical length nL both in one direction and also in the direction opposed to this one direction.

This construction can advantageously be used in wavelength demultiplexing systems (WDM systems) as an optical filter that can be trimmed exactly to the wavelength channels predetermined in the system in a bidirectional fashion, for example in the direction both of a higher and also of a lower wavelength, whereby the channel spacing can be advantageously between 400 GHz and 100 GHz. It can advantageously be used in a wavelength-dependent 1×N switch for measurement and monitoring purposes. Given use of the wavelength monitoring in WDM systems, complete compatibility with the WDM filters used is particularly advantageous, since, in this way, realistic relations arise in the measurement of bit error rates.

A construction of the inventive arrangement that exploits the thermo-optical effect preferably and advantageously comprises waveguides of a thermo-optical material, first means for producing a modification increasing in one direction of the optical length of the waveguide, for example a single electrode for heating of the thermo-optical material, which heats a part, increasing in the one direction from waveguide to waveguide of the optical length of each waveguide and second means for the production of a modification decreasing in the one direction of the optical length of the waveguide comprises at least one electrode for heating the thermo-optical material, which heats a part of the optical length of each wavelength that decreases in the one direction from waveguide to waveguide. The advantageous construction of this arrangement relative to electrodes for heating the thermo-optical material electrode for the production of a modification increasing in the one direction of the optical length of the waveguide and is limited to a region that covers, in a planar fashion, a part of the waveguides, which region comprises a width that increases in the one direction and essentially covers the electrode. In addition, the second means for producing the modification decreasing in the one direction is limited to a region that covers, in planar fashion, a part of the waveguide, which region comprises a width that decreases in the one direction and that essentially covers this electrode. These electrodes can cover their planar regions in a meandering fashion.

A preferred and advantageous embodiment of the arrangement has the waveguides fashioned in an optical layer made of a material with a determined heat conductivity that is arranged on a surface segment of a substrate made of a material with a greater heat conductivity in comparison with the material of the optical layer and the substrate is provided with insulating means that borders on the layer and is fashioned such that a region located under the electrodes in the substrate is thermally insulated from the remaining substrate. In this embodiment, the heating power of the electrode for the heating of the thermo-optical material can advantageously be drastically reduced. Preferably, the advantageous construction of this method is that the insulating means comprises recesses fashioned in the substrate that extend in the direction perpendicular to the surface segment through the entire substrate and borders on the layer and that the optical layer is made of glass while the substrate is made of silicon.

An inventive arrangement in which a modification of a given phase state is effected in mutually opposed direction by modifying the index of refraction of a photosensitive material. The waveguides which are formed of a material with an index of refraction that is modified by irradiating the material with light of a determined optical wavelength, means for producing a modification of the optical length of the waveguides comprises an illumination mask that covers the waveguides in which an opening is fashioned that exposes a part of the waveguide which part increases in one direction from waveguide to waveguide of the optical length of each waveguide for illuminating with the light of the predetermined wavelength and means for producing a modification of the optical length of the waveguides comprises a second illumination mask that covers the waveguides in which an opening is fashioned that exposes a part of the waveguide which decreases in the one direction from waveguide to waveguide of the optical length of each waveguide for illumination with the light of a second predetermined wavelength.

By means of the invention, a new type of optical arrangement having at least two optical waveguides which comprise an input-side end for coupling of the optical wave into the waveguide and a respective output-side end for coupling out an optical wave conducted in the waveguides and a determined optical length between the two ends is provided in which at least one waveguide comprises a photosensitive index of refraction modified by illuminating the waveguide with light of a predetermined optical wavelength. In one part of each of the optical wavelengths of each waveguide, there is an index of refraction that is modified by means of radiation with the light of a first predetermined wavelength in relation to an unmodified index of refraction for this wavelength and the one part with a modified index of refraction of an optical length of each waveguide which one part increases in a direction from waveguide to waveguide while another part which is modified by the light of a predetermined wavelength decreases in the one direction and shielding means are provided for shielding each waveguide with both an unmodified index of refraction and with a modified index of refraction against the radiation with the light that modifies the unmodified and modified indices of refraction of the waveguide.

Other advantages and features of the invention will be readily apparent from the following description of the preferred embodiments, the drawings and claims.

BRIEF DESCRIPTION OF THE DRAWINGS

FIG. 3 is a top plan view of a second embodiment of the invention;

DESCRIPTION OF THE PREFERRED EMBODIMENTS

Figure 1:
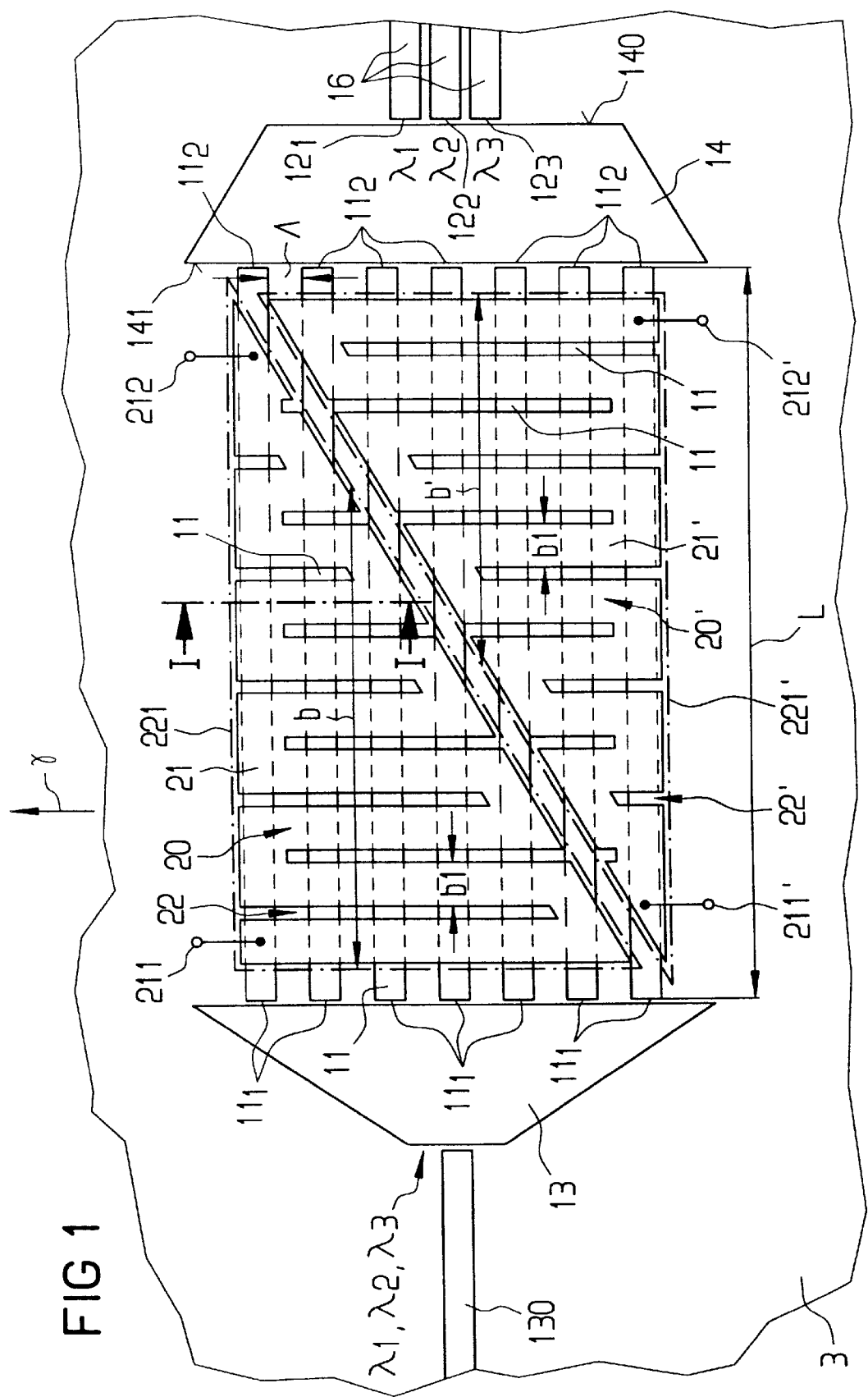
FIG. 1 is a top plan view of a first embodiment of the inventive arrangement.
Figure 2:
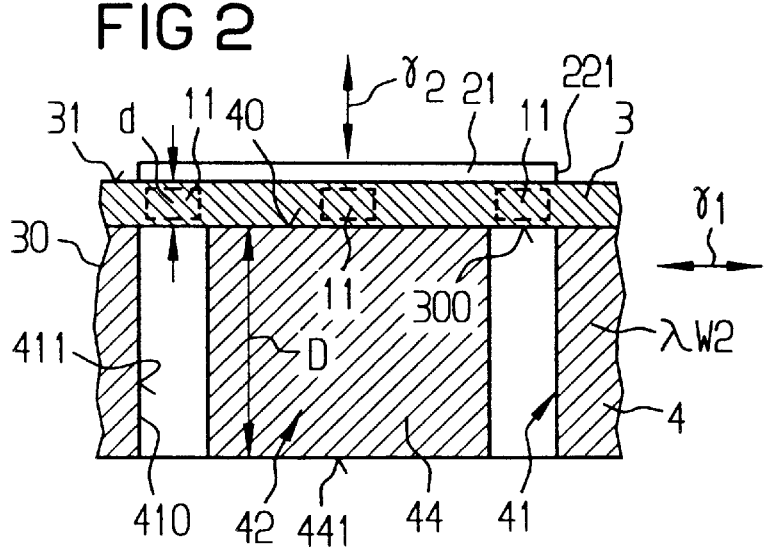
FIG. 2 is a cross-sectional view taken along the lines I—I of FIG. 1.

The principles of the present invention are particularly useful when incorporated in an optical arrangement illustrated in FIGS. 1 and 2. The arrangement consists of a plurality of optical waveguides 11, with each waveguide having an input-side end $11_1$ for coupling an optical wave into the waveguide 11 and a respective output-side end $11_2$ for coupling-out an optical wave conducted in the waveguide and a determined optical length nL between the two ends $11_1$ and $11_2$. The arrangement also includes first means 20 for producing a modification $\Delta(nL)$ of the optical length nL of the waveguides 11 so that the produced modification $\Delta(nL)$ of the optical length nL increases in a direction $\gamma$ from waveguide 11 to waveguide 11. The arrangement also includes second means 20' for producing a modification $\Delta(nL)$ of the optical length nL of the waveguides 11 so that the produced modification $\Delta(nL)$ of the optical length nL decreases in the one direction $\gamma$ from waveguide 11 to waveguide 11.

The optical length nL of each waveguide 11 is given by the product of its effective index of refraction n and the geometric length L of the waveguide.

The waveguides 11 are, for example, chosen so that they have the same effective index of refraction n.

Figure 4A:
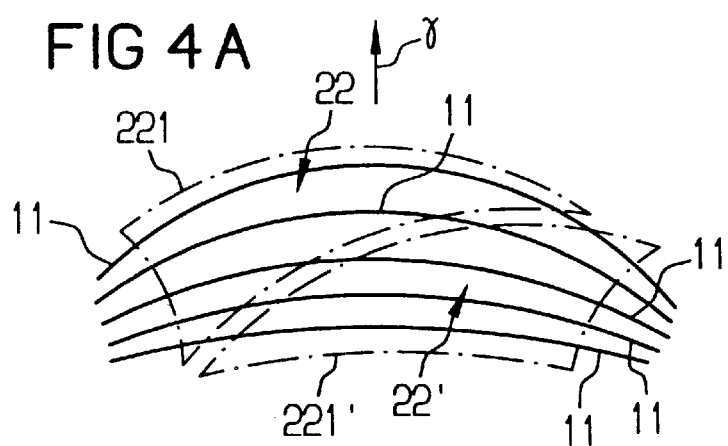
FIG. 4a is a partial plan view of the embodiment of FIG. 1 having curved waveguides covered by the electrode pattern.

In FIG. 1, the geometric length L of the waveguides 11 is shown with the same size for all waveguides 11, but this is the more infrequent case, because, for the most part, the waveguides 11 are dimensioned in such a way that their optical lengths nL and, thus, their geometric length L is different from waveguide to waveguide, despite the equal index of refraction n. This can occur by placing the waveguides in curved paths, such as illustrated in FIG. 4a.

The example according to FIGS. 1 and 2 assumes that, as in the specific embodiment of the known arrangement, although not shown, the geometric length L of the waveguides 11 increases in the direction $\gamma$ from waveguide 11 to waveguide 11 so that in FIG. 1, the lowermost waveguide 11 has the smallest geometric length L and, thus, the smallest optical length nL, and the uppermost waveguide 11 has the largest geometric length L and, thus, the largest optical length nL. As in the specific embodiments of the known arrangement, it is assumed that the optical lengths nL of the waveguides 11 increase in the direction $\gamma$ from waveguide 11 to waveguide 11 by the same amount.

Moreover, as in the specific embodiment of the known arrangement, it is assumed that the output-side ends $11_2$ of the waveguides 11 are arranged next to one another with a spatial distance A small enough that the optical waves coupled out from these ends $11_2$ are coherently superposed on one another. The previously specified embodiment forms an optical phased array for the spatial separation of optical wavelengths $\lambda_1$, $\lambda_2$ and $\lambda_3$ that are contained in the optical wave. As is known, this optical wave is coupled into all waveguides 11 of the phased array through the input-side ends 11₁ of these waveguides 11. In each of these waveguides 11, an optical power portion of this wave containing all of the wavelengths $\lambda_1$, $\lambda_2$ and $\lambda_3$ is conducted to the output-side ends 11₂ of the waveguides 11 and is coupled out at this end 11₂. The power portion coupled out from all output-side ends 11₂ are superposed coherently on one another.

The optical length nL of the waveguides 11 differs from one another and the coherent superposition of the coupled-out power portions have the effect that the coupled-out optical power portions falling at individual wavelengths $\lambda_1$, $\lambda_2$ or $\lambda_3$ are concentrated in spatial points 12₁, 12₂ or 12₃ that are individually allocated to these wavelengths $\lambda_1$, $\lambda_2$ or $\lambda_3$. The coupled-out optical power portions falling at the wavelengths $\lambda_1$, $\lambda_2$ or $\lambda_3$ differ from one another and are concentrated in spatial points 12₁, 12₂ or 12₃, respectively, and are spatially at a distance from one another.

The optical waves containing the different wavelengths $\lambda_1$, $\lambda_2$ and $\lambda_3$ is supplied to the input-side end 11₁, of each waveguide 11 of the phased array by means of a layer waveguide 13, which is known as a "fan-in" waveguide, which receives the wave from a supply waveguide 130. Adjacent the output-side ends 11₂ is a layer waveguide 14, which is known as a "fan-out" waveguide, which has a frontal surface 141 lying adjacent the output-side end and a second frontal surface 140, where the spatially separated spatial points 12₁, 12₂ and 12₃ are located. A continuous waveguide 16 is respectively coupled to the frontal surface 140 at each of the spatial points 12₁, 12₂ and 12₃. The number of waveguides 11 is not, as shown in FIG. 1, limited to seven, but can be smaller, but preferably is much larger. Likewise, the number of different wavelengths $\lambda$ to be separated is not limited to three, but rather can be smaller or larger. For example, it can be 17 different wavelengths.

As in the specific embodiment of the known arrangement, each waveguide 11 comprises thermo-optical material.

In contrast to the known arrangement, in the arrangement according to FIG. 1, the first means 20 for producing the modification $\Delta(nL)$ for increasing of the length nL of the waveguides 11 in the one direction γ comprises, for example, a single electrode 21 for the heating of the thermo-optical material, which heats a part, which increases in the one direction γ from waveguide 11 to waveguide 11 of the optical length nL of each waveguide. The electrode 21 is limited to a region 22 that covers, in a planar fashion, a part of the waveguides 11, which region comprises a width b that increases in the one direction γ and that essentially covers the electrodes 21, preferably in a uniform fashion. The region 22 is outlined by the dot-dashed line 221, which has a triangular configuration.

The second means 20' for the production of the modification $\Delta(nL)$ for decreasing of the optical length nL of the waveguide 11 in the one direction γ comprises a single electrode 21' for heating the thermo-optical material, which heats a part of the optical length nL of each waveguide 11 that decreases in the one direction γ from waveguide 11 to waveguide 11. The electrode 21' is limited to a region 22' that partially covers the waveguides 11 in a planar fashion, and this region comprises a width b' that decreases in the one direction γ and essentially covers the electrodes 21', preferably in a uniform fashion. The region 22' is outlined by a closed dot-dashed line 221', which has a shape of a triangle.

The electrode 21 covers the planar region 22 preferably in a meandering or serpentine fashion, and the electrode 21', likewise, covers the planar region 22' in a meandering or serpentine fashion. The electrode 21 runs in a meandering fashion between an electrical terminal 211 and an electrical terminal 212, and the electrode 21' runs in a meandering fashion between an electrical terminal 211' and an electrical terminal 212'. An electrical heating voltage is to be applied between the terminals 211 and 212 and an electrical heating voltage is to be applied between the terminals 211' and 212'. The width b1 of the electrodes 21 and 21' is shown in an exaggeratedly large fashion in FIG. 1. It is preferably chosen as small as possible and the spacing between segments of the electrode running parallel alongside one another is preferably chosen smaller than and not larger than the width b1.

The dot-dashed lines 221 and 221' shown respectively describe triangles with straight sides. This is due to the fact that the waveguides are shown running in parallel straight lines and with equal length between the ends 11₁ and 11₂. Due to having different geometrical lengths L, these waveguides 11 actually run, as in the specific embodiment of the known arrangement, in curves and with different curvatures. This has the result that the dot-dashed broken lines 221 and 221' actually respectively describe a triangle with curved sides (see FIG. 4a).

According to FIG. 2, the waveguides 11 of the example according to FIG. 1 is formed in an optical layer 3 that has an upper surface 31 on which the electrode, such as 21 or 21', is disposed and a lower surface 30, which resides on a surface or surface segment 40 of a substrate 4.

With respect to the reduction of the heating power, it is particularly advantageous if the layer 3 is made of a material with a determined heat conductivity $\lambda_{W1}$ and the substrate 4 is made of a material with a greater heat conductivity $\lambda_{W2}$ in comparison with the material of the optical layer 3. It is also desirable that an insulating means 41 is present in the substrate 4 that borders the layer 3 and is fashioned in such a way that a region 42 in the substrate 4 located under the electrode 21 or electrode 21' is thermally insulated from the rest of the substrate 4.

The insulating means 41, in this example, is a recess or groove 410 which is constructed in the substrate 4 and extends perpendicular in the direction γ2 toward the surface 40 of the substrate 4 entirely through the substrate 4 and borders on the layer 3. The groove or recess 410 forms a limiting surface 411 that surrounds in a closed annular fashion the thermally insulated region 42 of the substrate 4. The surface likewise extends perpendicular in the direction γ2 to the surface segment 40 of the substrate 4 through the entire substrate 4 up to the layer 3 and on which the substrate 4 borders from the outside in the direction γ1 parallel to the surface segment 40.

The limiting surface 411 of the recess or groove 410 should advantageously enclose a region 300 of the surface 30 facing the surface segment 40 of the substrate 4, which region 300 coincides with the projection perpendicular to the surface segment 40 of the substrate 4 of the region 22 or, respectively, 22', which region 22 is enclosed by the dot-dashed lines 221 and covered by the electrode 21 or region 22', which is enclosed by the dot-dashed lines 221' and covered by the electrode 21'. As mentioned above, the electrodes 21 and 21' are located on the surface 31, which is the upper surface, and faces away from the surface segment 40 of the electrode. Thus, for example, the limiting surface 411 of the recess or groove 410 should describe a line on the surface 30 of the layer 3 that coincides with the projection of the dot-dashed lines 221 and/or 221'. This measure is advantageous with respect to good optical characteristics of the inventive arrangement, in particular in the construction as a phased array.

The recess 410 can be filled with air or with other gases. It can also be filled with a liquid or solid thermally insulating material with a low heat conductivity.

In the example according to FIGS. 1 and 2, the recess 410 consists of a trench extending vertically in the direction γ2 toward the surface segments 40 through the entire substrate 4 up to the layer 3. The trench or groove 410 surrounds, in a closed annular fashion, a part 44, which is left standing in the substrate 4, and this part is located entirely in the thermally insulated region 42 and extending in the direction γ1 parallel to the surface segment 40 of the substrate. Thus, the part 44 is thermally insulated from the rest of the substrate 4. During the operation of the arrangement, a surface 441 of the part 44, which surface 441 faces away from the surface segment 40 of the substrate 4, is to be thermally insulated against the environment by means of air or another thermally insulating material with a low heat conductivity.

In an exemplary embodiment, the optical layer 3 is made of quartz glass and the substrate 4 is made of silicon, which has a heat conductivity greater by approximately a factor of 100 than that of glass. The substrate 4 comprises a thickness D of approximately 500 μm and is considerably larger than the thickness d of the layer 3, which is, for example, less than 100 μm. The trench-type groove or recess 410 can be produced in the substrate with the aid of an ultrasound polishing or grinding processes and subsequent wet etching with KOH.

The part 44 left standing in the substrate 4 is not required; rather, with respect to a reduction of heating power, it would be more advantageous to omit this part 44 and to fill the recess 410 completely with a thermally insulating material, for example air. The manufacturing of the trench-type recess 410 annularly surrounding a central part 44 left standing of the substrate 4 is relatively more simple, at least in the case of silicon.

Despite the presence of the part 44 in the thermally insulated region 42, in the above example, a reduction of the heating power by 99% in relation to an example with the same construction without the recess 410 and thermally insulated region 42 in the substrate 4 can be achieved.

The embodiment according to FIG. 3 differs from the example according to FIGS. 1 and 2 essentially only in the different division of the regions 22 and 22'. While, for example, the region 22 still consists of a single triangle, the region 22' is composed of two smaller triangles, of which each is enclosed by a dot-dashed line 221' and contains a serpentine-shaped electrode 21'.

In contrast to the example according to FIG. 1, in which the parallel segments running alongside one another of the electrode 21 and the parallel segments running alongside one another of the electrode 21' are oriented in the same direction γ, the parallel running segment of the electrodes 21' of the two smaller regions 22' of the embodiment of FIG. 3 extend in a direction γ' and γ". These directions are oblique at an angle to the segments of the electrode 21 that run parallel to one another and are oriented in the direction γ. These directions γ' and γ" form an angle of approximately 90° to each other.

In FIG. 3, the waveguides 130, 13, 14 and 16 for coupling in and coupling out of the optical waves have been omitted for simplicity. Otherwise, identical reference characters in FIGS. 1 and 2 designate identical parts.

Figure 4B:
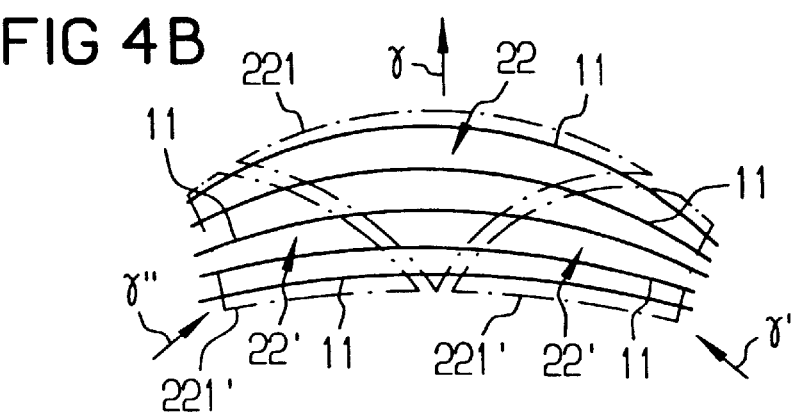
FIG. 4b is a partial plan view of the embodiment of FIG. 3 having curved waveguides covered by the electrodes pattern.

In the embodiments according to FIGS. 1 and 3, the waveguides 11, as in the specific embodiment of the known arrangement, are curved and run with different curvatures so that the closed dot-dashed lines 221 and 221', respectively, describe triangles with curved sides, as shown in FIGS. 4a and 4b, and not straight sides, as shown in FIGS. 1 and 3. Moreover, this embodiment of FIG. 3 can comprise a layer construction according to FIG. 2 and can have a thermally insulating region, such as found in the substrate 4.

In FIG. 4a for the case of the example according to FIGS. 1 and 2, and in FIG. 4b for the case of the example according to FIG. 3, regions 22 and 22' are shown qualitatively, with waveguides running in a curved fashion. The curved dot-dashed lines 221 and 221' are curved in view of the curved fashion of the waveguides 11 so that the triangular configurations of the regions 22 and 22' are defined by curved lines.

Figure 5:
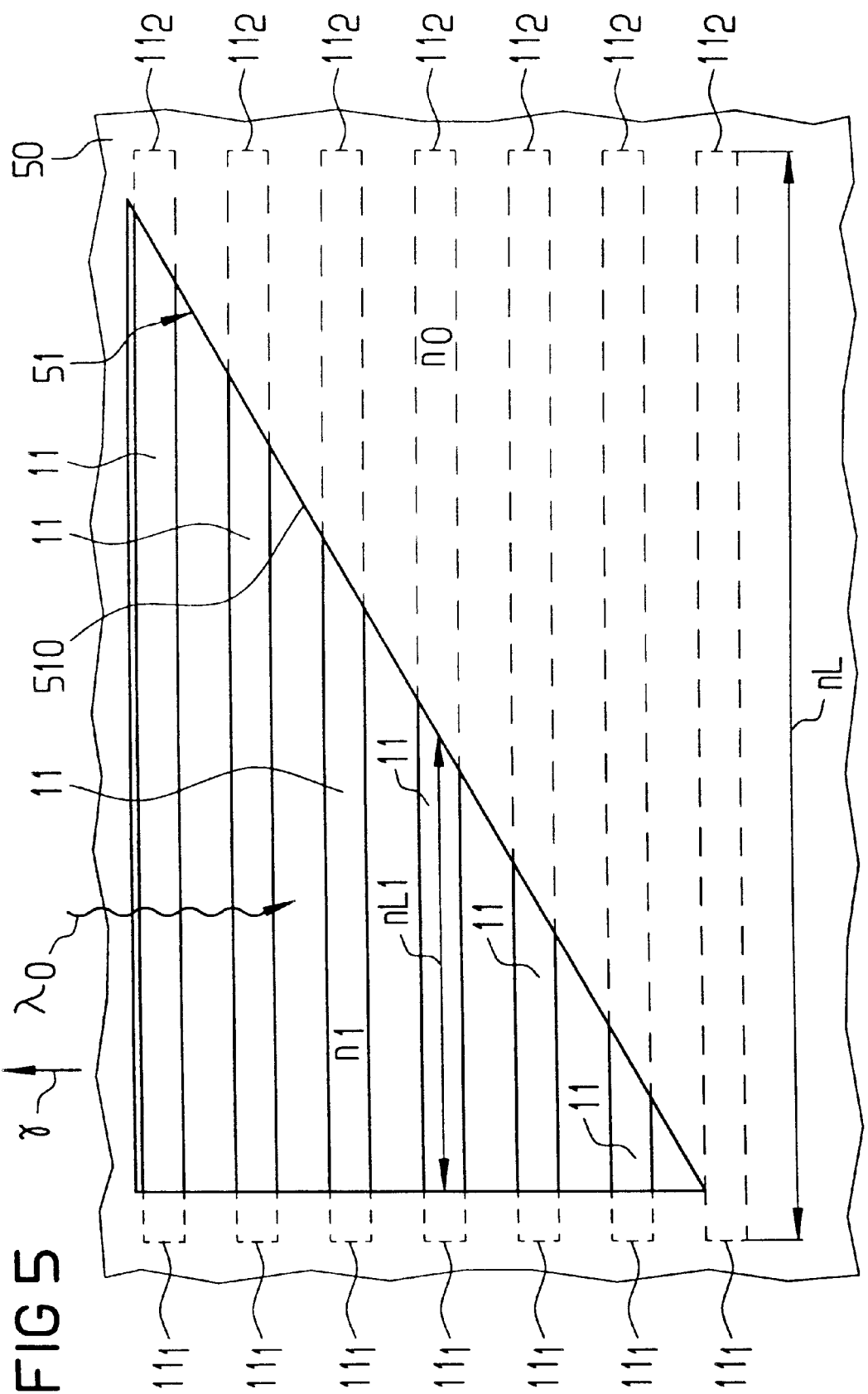
FIG. 5 is a top plan view of waveguides which are partially covered with an exposure mask.

FIG. 5 shows a top view of an optical arrangement consisting of several optical waveguides 11, of which each comprises an output-side end $11_1$ for coupling an optical wave into the waveguide and a respective input-side end $11_2$ for coupling-out a waveguide conducted in the waveguides. Each of the waveguides has a determined optical length nL between the two ends $11_1$ and $11_2$. The arrangement can be a phased array, as the embodiments according to FIGS. 1–4.

In this arrangement, each waveguide 11 comprises a material with an index of refraction $n_0$ that can be modified by irradiation of the material with light of a determined optical wavelength $\lambda_0$. The index of refraction $n_0$ is not to be confused with the effective index of refraction n of the waveguide 11, and it is, for example, the index of refraction of the material of the light-conducting core of the waveguide 11, and determines the effective index of refraction of the waveguide 11.

The means for production of the modification Δ(nL), increasing in the one direction γ of the optical length nL of the waveguide 11, comprises, in this arrangement, an exposure mask 50 that covers the waveguides 11, which mask is not transparent for the particular wavelength $\lambda_0$. An opening 51 is fashioned in the mask 50 and the opening 51 exposes a part nL 1, increasing from waveguide to waveguide in the one direction γ of the optical length nL of each waveguide for illumination with the light of the determined wavelength $\lambda_0$.

The modification Δ(nL) increasing in the one direction γ of the optical length nL of the waveguides 11 is produced by temporary illumination of the waveguides 11 exposed in the opening 51 with the determined wavelength $\lambda_0$. The modification Δ(nL) is permanent after this exposure if no subsequent illumination with this wavelength $\lambda_0$ takes place.

This permanent modification Δ(nL) of the optical length nL of the waveguides 11 is that there exists in one direction, which is the direction of increase, in a part nL1 of the optical length nL of each waveguide 11, which part nL1 is defined by the opening 51 of the mask 50, an index of refraction $n_1$, that is permanently modified by the irradiation with the light of the determined optical wavelength $\lambda_0$ in relation to the unmodified index of refraction $n_0$ of this wavelength 11. The length of the part nL1, which has an increased index of refraction $n_1$, increases in one direction γ from waveguide 11 to waveguide 11.

Figure 6:
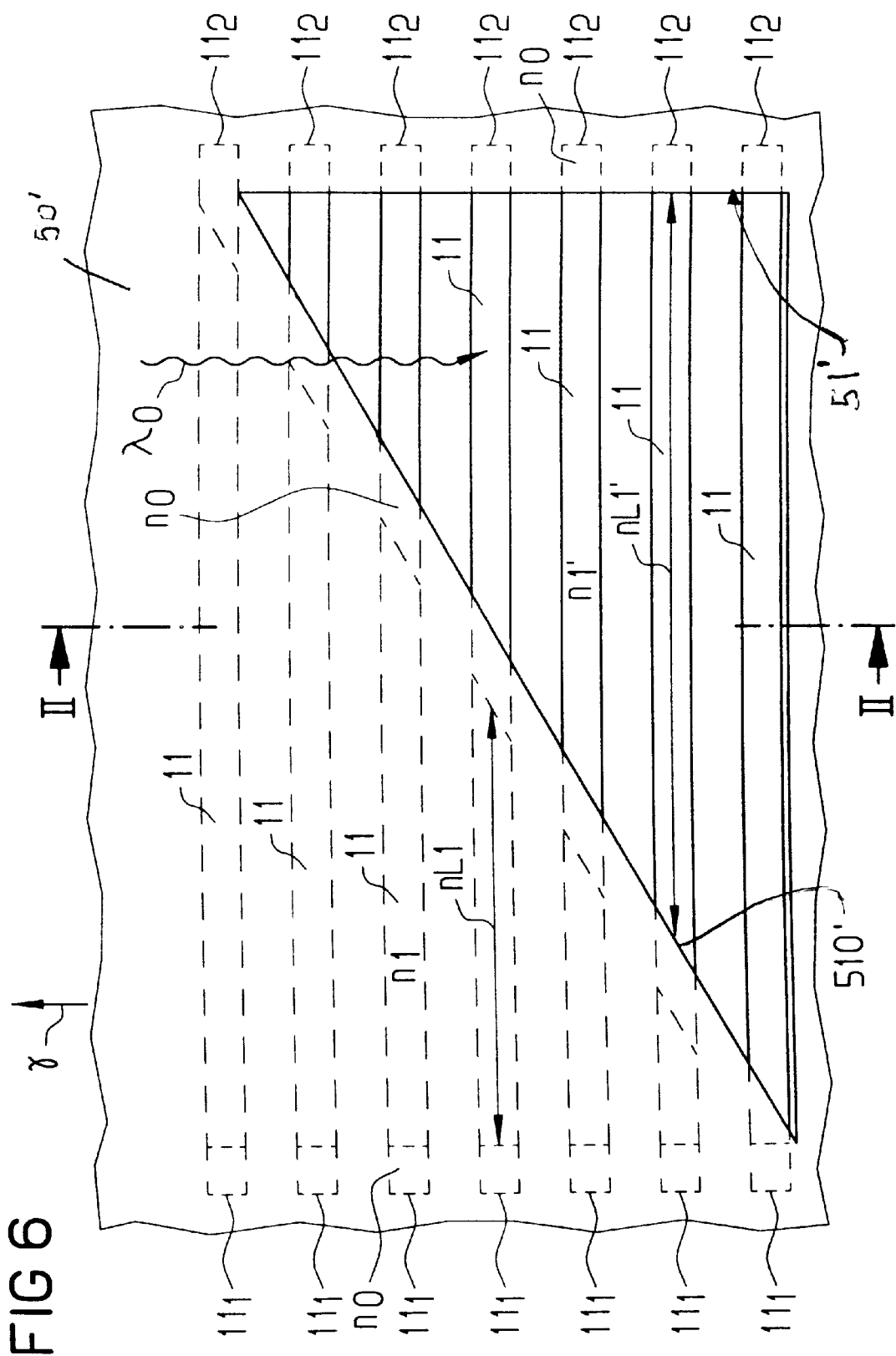
FIG. 6 is an optical arrangement of FIG. 5 in the same representation, wherein the optical waveguides are partially covered with another exposure mask.

The means for producing the modification Δ(nL) decreasing in one direction γ of the optical length nL comprises an exposure mask 50' shown in FIG. 6, which shows the arrangement according to FIG. 5 in a same manner of representation. The mask 50' covers the waveguides 11 and is opaque to the determined wavelength $\lambda_0$ and has an opening 51' which is fashioned to expose a part nL1' which decreases from waveguide 11 to waveguide 11 in one direction γ. Thus, a portion of the optical length nL of each waveguide 11 is exposed with light of the determined wavelength $\lambda_0$.

This modification $\Delta(nL)$ decreasing in one direction $\gamma$ of the optical length nL of the waveguides 11 is produced by means of a temporary illumination of the waveguides 11 exposed in the opening 51' with the determined wavelength $\lambda_0$ and is permanent if no subsequent illumination by wavelength $\lambda_0$ takes place. This permanent modification $\Delta(nL)$ of the optical length nL of the waveguide 11 is that there exists a part nL1' of an optical length nL of each waveguide 11, which part is defined by the opening 51' of the mask 50', an index of refraction $n_1'$ that is permanently modified by the irradiation with the light of the determined optical wavelength $\lambda_0$ in relation to the unmodified index of refraction $n_1$, of this waveguide 11. The length of the part nL1, for example with an increased index of refraction $n_1'$ decreases in the one direction $\gamma$ from waveguide 11 to waveguide 11.

The illumination using the mask 50 and the illumination using the mask 50' are carried out in chronological succession, wherein the sequence is unimportant.

One may, therefore, for example, proceed in such a way that in the first-executed illumination with a mask 50 or 50' a modification $\Delta(nL)$ of the optical length nL of the waveguides 11 is produced, and by means of a subsequent illumination with the other mask 50' or 50, which illumination is tuned chronologically and/or with respect to intensity, this modification $\Delta(nL)$ is trimmed to a desired value. With this method, for example, a phased array can be trimmed to a determined wavelength channel in which, at least during the second illumination with the other mask, an output signal of the phased array is observed, and this illumination is interrupted as soon as the desired output signal is obtained.

Preferably, the illumination following the illumination with the determined wavelength $\lambda_0$ is carried out in the region of the waveguide 11 that was not illuminated during the first illumination.

In the example shown in FIGS. 5 and 6, the edge 510 of the mask 50 surrounding the opening 51 coincides with the dot-dashed line 221 of FIG. 1 and the edge 510' of the mask 50' surrounding the opening 51' coincides with the dot-dashed line 221' in FIG. 1. The openings 51 and 51' can also, for example, be fashioned in such a way that the edges surrounding these openings of the relevant mask 50 or 50' coincide with the dot-dashed lines 221 or, respectively, 221' in FIG. 3 or FIG. 4a or FIG. 4b.

The part nL1 or, respectively, nL1' of the optical length nL of the waveguide 11 produced in an illumination with a mask 50 or 50' and having a modified index of refraction $n_1$, or, respectively, $n_1'$ need not be contiguous. Such a part nL1 or, respectively, nL1', consisting of several regions, can, for example, be obtained by the use of a mask 50 or, respectively 50' if this mask 50 or, respectively, 50' comprises two or more openings 51 or 51' separated from one another.

After the termination of the illuminations with the determined wavelength $\lambda_0$, an optical arrangement results that consists of several optical waveguides with each waveguide having an input-side end $11_1$ for coupling an optical wave into the waveguides 11, a respective output-side end $11_2$ for coupling out the optical wave conducted in the waveguide 11 and a determined optical length nL between the two ends $11_1$ and $11_2$. At least one waveguide 11 has a photosensitive index of refraction $n_1$, modified by illuminating this waveguide 11 with light of a determined optical wavelength $\lambda_0$.

In the optical arrangement according to the examples of FIGS. 5 and 6, after the termination of the two illuminations, there is present in one part nL1 of the optical length nL of each waveguide 11 an index of refraction $n_1$, that is modified, for example enlarged, by means of irradiation with light of a determined optical wavelength $\lambda_0$, in relation to the unmodified index of refraction $n_0$ of this waveguide. The length of the part nL1 of each waveguide 11 increases in the direction $\gamma$ from waveguide 11 to waveguide 11. In another part nL1', different from the one part nL1, of the optical length nL of each waveguide 11, there is present an index of refraction $n_1'$ that is modified, for example enlarged, by means of irradiation with light of a determined optical wavelength $\lambda_0'$ in relation to the unmodified index of refraction $n_0$ of this waveguide 11. The length of the other part nL1' of each waveguide decreases in one direction $\gamma$ from waveguide 11 to waveguide 11.

Figure 7:
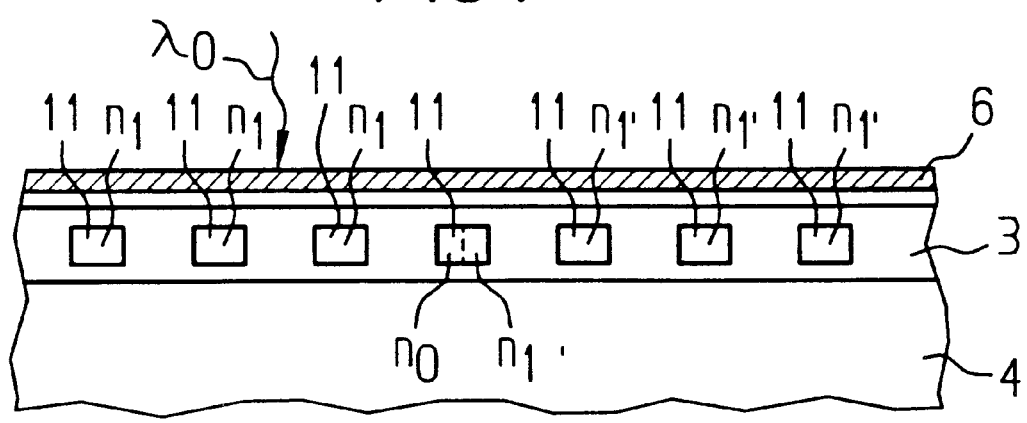
FIG. 7 is a cross-sectional view taken along the lines II—II of FIG. 6.

So that the unmodified and modified index of refraction $n_0$, $n_1$ and $n_1'$ no longer change after the termination of all illuminations with a determined wavelength $\lambda_0$, a shielding means is preferably present for the shielding of each waveguide 11 with unmodified and with modified index of refraction $n_0$, $n_1$ and $n_1'$ against irradiation with light that modifies the unmodified and modified index of refraction of these waveguides 11. Such a shielding 6 is shown in FIG. 7 and covers the mask 50'. The shielding 6 can, for example, be a housing into which the optical arrangement is built or inserted.

Although various minor modifications may be suggested by those versed in the art, it should be understood that we wish to embody within the scope of the patent granted hereon all such modifications as reasonably and properly come within the scope of our contribution to the art.

We claim:

1. An optical arrangement comprising at least two optical waveguides with each waveguide having an input-side end for coupling an optical wave into the waveguide and a respective output-side end for coupling out an optical wave conducted in the waveguide and having a determined optical length between the two ends, each waveguide comprising a thermo-optical material in an optical layer being made of a material with a heat conductivity, first means for producing a modification of the optical length of the waveguides increasing in one direction comprising a single electrode for heating of the thermo-optical material, which electrode heats a part of each waveguide with the amount of the part increasing in the one direction from waveguide to waveguide and second means for producing a modification of the optical length of the waveguide decreasing in the one direction comprising at least one electrode for heating the thermo-optical material, which electrode heats a part of the optical length of each waveguide with the amount of the part decreasing in the one direction from waveguide to waveguide, said optical layer being arranged on a surface of a substrate being made of a material with a greater heat conductivity than the heat conductivity of the material of the optical layer, said substrate having insulating means bordering on the optical layer and being fashioned so that a region located under each electrode in the substrate is thermally insulated from the remaining portions of the substrate.

2. An optical arrangement according to claim 1, wherein the insulating means comprises a recess fashioned in the substrate that extends in the direction perpendicular to the surface of the substrate through the entire substrate and contacts the optical layer.

3. An optical arrangement according to claim 1, wherein the optical layer is made of glass.

4. An optical arrangement according to claim 1, wherein the substrate is made of silicon.

5. An optical arrangement comprising at least two optical waveguides with each waveguide having an input-side end for coupling an optical wave into the waveguide and a respective output-side end for coupling out an optical wave conducted in the waveguide and having a determined optical length between the two ends, each waveguide comprising a material with an index of refraction being modified by irradiating the material with light of a determined optical wavelength, first means for producing a modification of the optical length of the waveguides increasing in one direction comprising a first illumination mask covering the waveguides, said first illumination mask having an opening being constructed to expose a part of each waveguide, which part increases in the one direction from waveguide to waveguide so that part of the waveguide illuminated through the first illumination mask increases from waveguide to waveguide in the one direction and second means for producing the modification of the optical length of the waveguide comprising a second illumination mask covering the waveguides and having a second opening which is fashioned to expose a part of each waveguide with the part decreasing in the one direction from waveguide to waveguide so that the length of the waveguide illuminated with the light of the predetermined waveguide decreases in said one direction from waveguide to waveguide.

6. An optical arrangement having at least two optical waveguides with each waveguide having an input-side end for coupling an optical wave into the waveguide and a respective output-side end for coupling out an optical wave conducted in the waveguide and a determined optical length between the two ends, said waveguides comprising a part of a photosensitive index of refraction modified by illumination of the waveguide with light of a determined optical wavelength in relation to an unmodified index of refraction and a length of the part increasing in one direction from waveguide to waveguide.

7. An optical arrangement according to claim 6, which includes another part for each waveguide different from the one part having an index of refraction that is modified by means of irradiation with light of a determined optical wavelength in relation to an unmodified index of refraction of the waveguide and the other part has a length in each waveguide that decreases in the one direction from waveguide to waveguide.

8. An optical arrangement according to claim 7, which includes shielding means for shielding each waveguide with the unmodified and modified index of refraction against irradiation with light that modifies the unmodified and modified index of refraction.

9. An optical arrangement according to claim 6, which includes shielding means for shielding each waveguide with the unmodified and modified index of refraction against irradiation with light that modifies the unmodified and modified index of refraction.

* * * * *